Oct. 18, 1966  H. E. TEMPLE  3,279,634
TRANSFER APPARATUS

Filed Feb. 11, 1965  4 Sheets-Sheet 1

INVENTOR.
HIRAM E. TEMPLE
BY
ATTORNEYS

Oct. 18, 1966 H. E. TEMPLE 3,279,634
TRANSFER APPARATUS
Filed Feb. 11, 1965 4 Sheets-Sheet 2

INVENTOR.
HIRAM E. TEMPLE
BY
ATTORNEYS

Oct. 18, 1966   H. E. TEMPLE   3,279,634
TRANSFER APPARATUS
Filed Feb. 11, 1965   4 Sheets-Sheet 3

INVENTOR.
HIRAM E. TEMPLE
BY
ATTORNEYS

Oct. 18, 1966  H. E. TEMPLE  3,279,634
TRANSFER APPARATUS

Filed Feb. 11, 1965 4 Sheets-Sheet 4

INVENTOR.
HIRAM E. TEMPLE
BY
ATTORNEYS

United States Patent Office 3,279,634
Patented Oct. 18, 1966

3,279,634
TRANSFER APPARATUS
Hiram E. Temple, Saginaw, Mich., assignor to Baker Perkins Inc., Saginaw, Mich., a corporation of New York
Filed Feb. 11, 1965, Ser. No. 431,964
19 Claims. (Cl. 214—309)

The present application relates generally to transfer apparatus particularly of the character for removing farinaceous products from pans and transporting them to discharge conveyor means or the like, and is a continuation-in-part of my application Ser. No. 175,035, filed Feb. 23, 1962 and now Patent No. 3,170,581. My prior filed application illustrates but is not limited to depanning or detinning apparatus for continuously removing bread loaves from pans in which they have been baked as the pans proceed continuously through the apparatus either individually or in groups having a number of pans strapped together to form a panset. In the present application, I have illustrated apparatus of the same general character which is designed particularly for depanning buns, rolls and other diverse products of various sizes and shapes which, in many instances, have seeds embedded in their upper surfaces.

One of the prime objects of the invention is to provide apparatus of a non-impact type suitable for rapidly and efficiently depanning rolls such as the common dinner variety as well as for depanning elongated rolls such as frankfurter buns without damaging the pans or products involved.

A further object of the invention is to provide a depanning machine employing a rotary depanning drum on which suction cups are mounted which engage and remove the rolls proceeding longitudinally in pans on a longitudinally extending conveyor and deliver them to another conveyor located above the pan transporting conveyor and adjacent to the rotary path of the cups on the revolving drum.

Still another object of the invention is to provide a depanning drum of the character described which is so mounted that it can be moved in a path generally normal to the conveying run of the discharge conveyor while at the same time being movable angularly about a suitable axis so that compound adjustment to obtain a proper position relative to the conveying run of the product discharge conveyor is possible.

Still another important object of the invention is to provide seed collection means for accumulating seeds which are dislodged from the rolls and which otherwise would proceed to and in time foul the suction fan producing the suction lifting forces for the suction conveyor cups.

Still a further object of the invention is to provide a partitioned seed collection tray which is disposed in a housing or duct means of enlarged volume upstream of the suction fan and which may be readily and conveniently removed to permit disposal of the accumulated seeds.

Other objects and advantages of the invention will be pointed out specifically or will become apparent from the following description when it is considered in conjunction with the appended claims and the accompanying drawings, in which:

Figure 1:
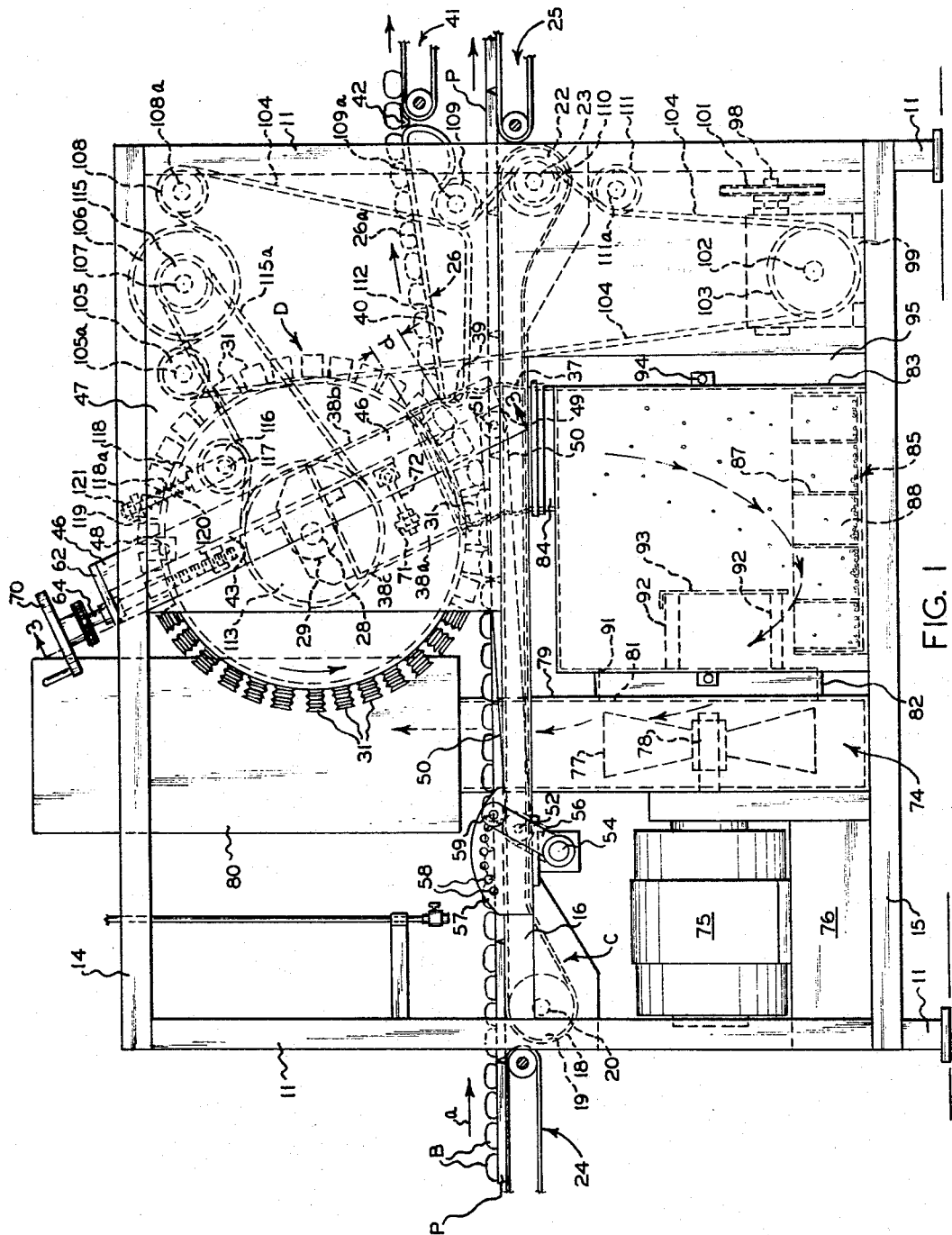
FIGURE 1 is a side elevational view illustrating my depanning machine in operation, removing buns or rolls from pans and transporting them to a discharge conveyor.

Referring now more particularly to the accompanying drawings in which are shown a preferred embodiment of the invention only, a letter F generally illustrates supporting framework for the depanning apparatus which can take any desired form and, as shown here, includes end vertical frame members 11 connected by top and bottom rails 12 and 13, respectively. Upper and lower longitudinal rail members 14 and 15 connect the front and rear members 11 at both sides to form an oblong open framework F suitable for supporting depanner elements, and longitudinal medial rail members 16 connect the front and rear vertical members 11 on both sides of the framework and may be connected at their ends by medial cross rails 17.

Figure 2:
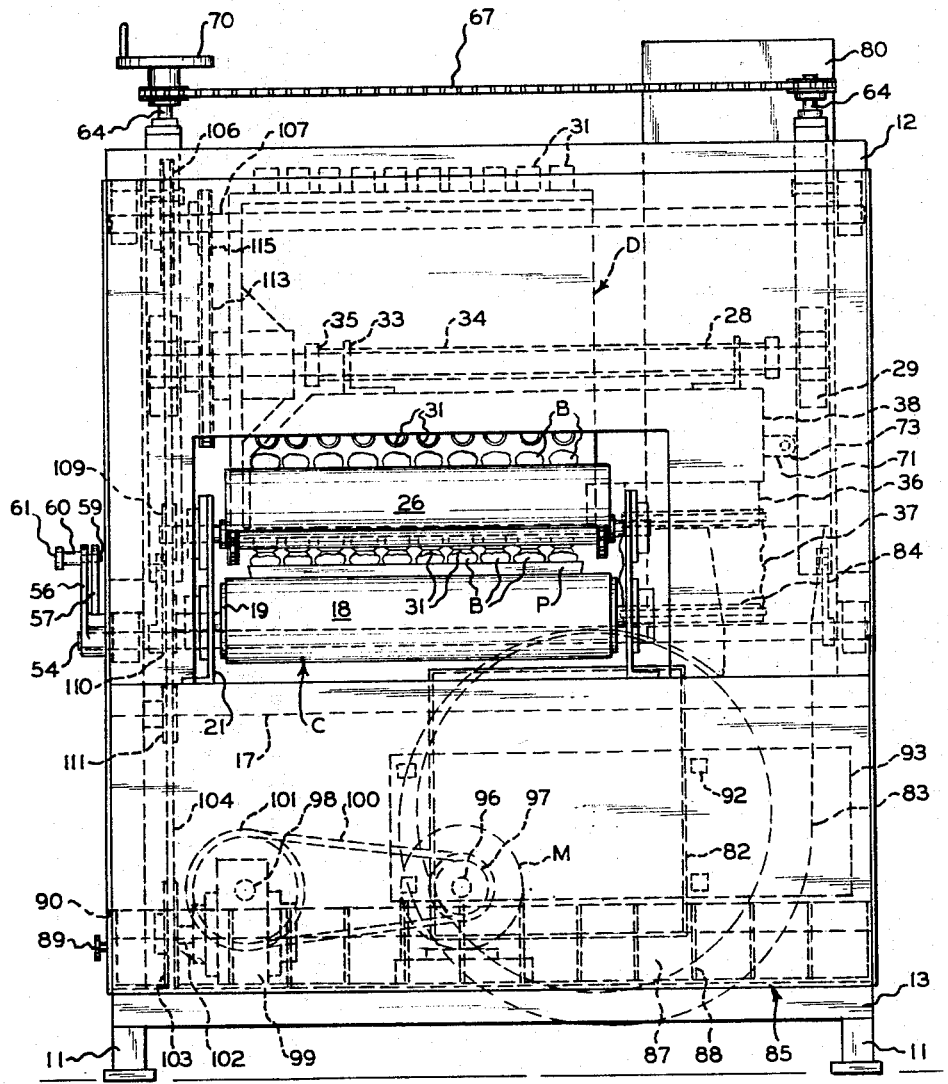
FIGURE 2 is a right end elevational view thereof.

As shown particularly in FIGURES 1 and 2, the apparatus includes a generally longitudinally disposed conveyor generally designated C, comprising an endless belt member or the like 18, trained around a front roll 19 journaled on a shaft 20 supported by bearings 21, and a rear roll or the like 22 mounted on a drive shaft 23 supported by similar bearings. An endless delivery conveyor 24 is shown as delivering pans P, with individual pockets for rows of buns or rolls B, to the conveyor C, and a discharge conveyor 25, also of endless character, is shown as receiving the emptied pans P from conveyor C.

Supported in juxtaposed relation with the conveyor C at a spaced distance above the upper run conveying surface thereof is a rotary transfer drum generally designated D which functions to remove the rolls or buns B from the pans P and deliver them to an endless discharge conveyor generally designated 26. As shown particularly in FIGURE 3, the drum D comprises a generally cylindrical hollow member 27 keyed as at 28a to a shaft 28 supported by bearings 29. Rows of apertures 30 are provided in the peripheral wall of the hollow drum D and suction cup members of the character particularly described in my aformentioned parent application are mounted in position on the drum wall by threaded stems 31a (FIGURE 3) to communicate with the openings 30.

Extending into the one end of the drum D, which is open as shown, is a suction duct or box generally designated 32 which is supported by brackets 33 from a sleeve 34 on shaft 28 which is prevented from rotating with the shaft 28. Collar positioning members 35 are provided on the shaft 28 to maintain the suction duct 32 in axial position. The duct means 32 includes a portion 36 connected by means of a flexible boot 37 with a suction source to be later described, and incorporates a suction box portion 38 having front and rear walls 38a and 38b which is closed except at its bottom and has the lower edges of its side walls shaped to the curvilinear configuration of the inner peripheral wall of the drum D which rotates continuously relative to the suction box portion 38. As noted, the lower end of the suction box 38 is open to draw air through the suction cups 31 and openings 30 in communication with the suction box 38 at a particular time and the buns B are lifted from the pans by the suction, the suction force being of sufficient strength to collapse the bellows cups 31 axially to some extent to aid the lifting of the buns or rolls from the pans P.

The bun receiving conveyor 26 includes a front end run portion 39 joining with an upper run portion 40 which conveys the buns to an endless bun discharge conveyor generally designated 41 over a conveyor bridge portion 42. The end run portion 39 is located substantially just below the rear wall 38b of the suction box 38, and the upper run portion 40 extends longitudinally therefrom at a slightly upwardly inclined angle. It will be observed that the buns B are disposed in transverse rows in the pans P and it should be understood that they are to be deposited in transversely aligned rows on the conveyor 26 (see FIGURE 2). It is necessary that the rows of buns deposited on conveyor 26 be parallel so that the buns are in condition for subsequent processing and the buns, when released, should not be released in staggered relation so that a subsequent aligning operation is necessary. Thus, the suction cups 31 in a particular row on the drum D must uniformly release the buns B simultaneously to the conveyor 26. I have found that the distance $d$ in FIGURE 1 between the lower edge of the rear wall 38$b$ of the drum and the initial receiving surface of the conveyor 26 is critical, and must be varied to properly process buns of various sizes and shapes. The processing of elongate frankfurter buns is a particularly sensitive operation because of their length and tendency to buckle medially of their length when their trailing ends are held upwardly at one angle, while their leading ends are forced downwardly upon the upper run 40 of the conveyor 26 by the cups 31 which axially expand after passing the wall 38$b$.

As will become apparent, the present apparatus permits angular positioning of the suction drum D relative to the front edge of the upper run 40 of conveyor 26, as well as generally vertical positioning of the drum D relative to the upper run 40 of conveyor 26 in a plane extending generally normally to the upper run 40. Attention is particularly directed to the slides 43 on which the bearings 29 are mounted, and it will be noted that guide pins 44 projecting from the slides 43 are receivable in elongated slots 45 provided on support rail members 46. The rail members 46, which are disposed at a downwardly inclined angle as shown in FIGURE 1, are pivotally supported near their upper ends by means of pins 48 received in side plates 47 secured between the upper and middle longitudinal frame members 14 and 16. At their lower ends the rails 46 are provided with ears 49 to which connecting links 50 are pivotally secured by pins 51, as shown particularly in FIGURES 1, 3 and 4. At their front ends the connecting links 51 are pivotally connected as at 52 to arms 53 which are fixed on a rotary shaft 54 supported by bearings 55 on the longitudinal frame rails 16, and at one side of the machine a handle lever 56 is fixed to the shaft 54 to permit angular rotation of the shaft 54 to pivot the drum D and suction box 38 about the pins 48. A retaining plate 57 is mounted on the rail 16 adjacent handle lever 56 and is provided with a curvate row of apertures 58 arranged on an arc having the axis of shaft 54 as an axis so that a retaining pin 59, slideably received in a bearing part 60 on the handle lever 56 and having a knob 61, may be displaced axially to enter one of the openings 58 and position the drum D and suction box 38 in a particular angular relation relative to the end run 39 of conveyor 26. Thus, in the manner indicated, the position of the suction cut-off point or rear end wall 38$b$ of the suction box may be varied with respect to the leading edge of the upper run 40 of conveyor 26 and, at the same time, to achieve desired positions, the slides 43 may be moved along the supporting rails 46.

Figure 3:
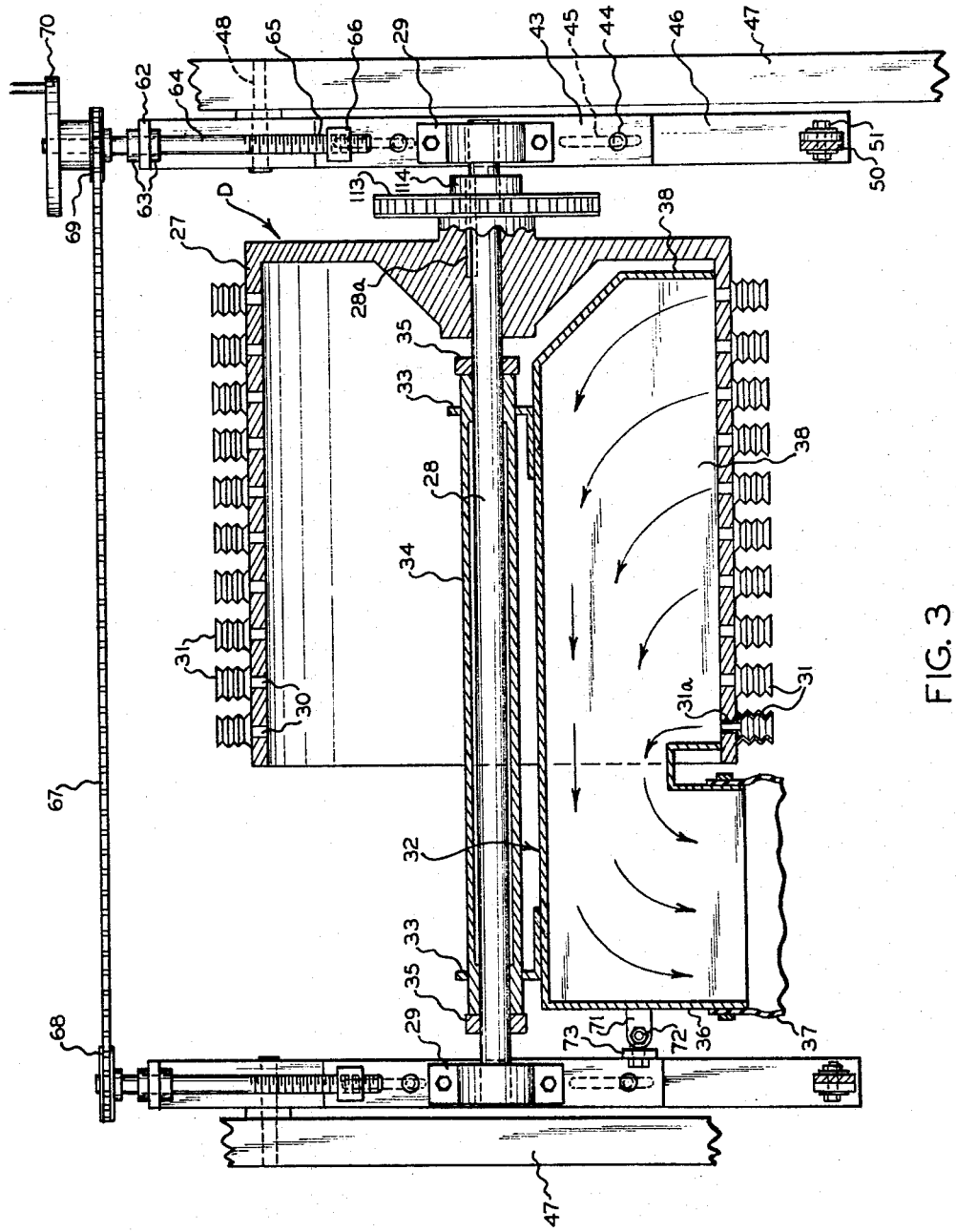
FIGURE 3 is a fragmentary, transverse sectional view on an enlarged scale, taken on the line 3—3 of FIGURE 1.
Figure 4:
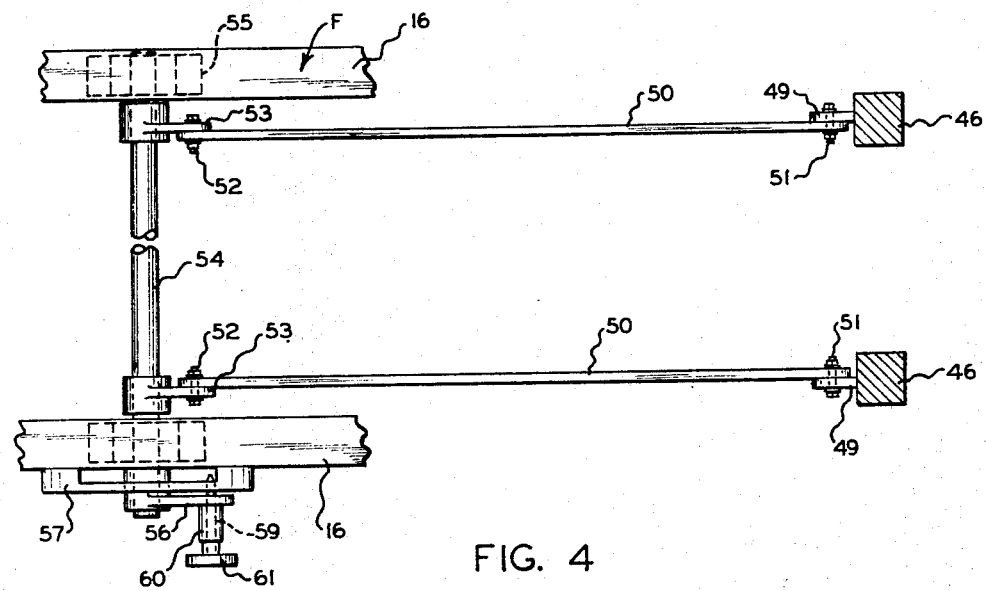
FIGURE 4 is a fragmentary, enlarged top plan view illustrating only certain elements of the apparatus for moving the bun transporting drum to positions for depanning a variety of buns and rolls.
Figure 5:
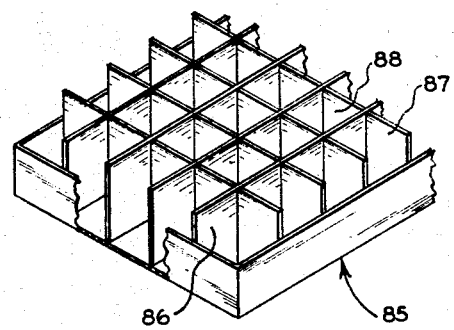
FIGURE 5 is an enlarged, framentary, perspective view of seed collecting means which is employed.

Plates 62 are mounted on the upper ends of rails 46 for journaling shafts 64 which have threaded ends 65 received in threaded nut members 66 which are fixed on the slides 43, members 63 on the shafts 64 preventing axial displacement of the shafts. The two shafts 64 are connected by a chain 67 trained around sprockets 68 and 69 fixed to the shafts 64, and a handle member 70 is fixed on the one shaft 64 as shown in FIGURE 3. With the nuts 66 fixed in position and unable to rotate, and the shafts 64 unable to move axially, revolution of the handle 70 and shafts 64 will move the slides 43 upwardly and downwardly to desired positions. The suction box 38 moves with the slides 43 because of its location within the drum D and its connection to the one slide 43. An ear member 71 fixed to the portion 36 of the suction box means 32 is connected by means of a bolt 72 to an ear member 73 fixed on the adjacent slide 43.

The suction is provided by a suction fan assembly generally designated 74 which includes a motor 75, supported on a motor mount bed 76 and having blades 77 mounted on its armature shaft 78 within a fan blade housing 79 which includes an enlarged upper portion 80 at its upper end to discharge an air stream to atmosphere. The fan housing 79 is also open at its rear end, as at 81, and communicates through a connecting duct 82 with a seed collecting housing 83 which, it will be observed, is of considerably greater volume than the suction duct means 32 and the duct portions which connect it with the housing 83. As shown in FIGURE 1, the lower end of the flexible boot 37 is coupled to an inlet part 84 provided on the one end of housing 83.

Received within the housing 83 and covering substantially the entire bottom thereof is a tray 85 divided by longitudinal baffle partitions 86 and transverse baffle partitions 87 into seed collecting compartments 88. A knob 89 may be provided on one side of the tray so that it may be pulled out the opening 90 in the one side wall of housing 83, which snugly accommodates it, to permit emptying of the seeds from the compartments 88. The front wall of housing 83 has an opening 91 corresponding in size to the connecting duct 82 and opening 81 leading into the fan housing 79, and supported in front of the opening on support posts 92 is a baffle plate 93. The housing 83 may be secured in place by bolt members 94 secured to vertical framework brace members 95.

Providing the power for a drive system is a motor M having an armature shaft 96 mounting a pulley 97 and driving the input shaft 98 of a speed reducer 99 through a drive belt 100 and a pulley 101 mounted on the shaft 98. The output shaft 102 of speed reducer 99 mounts a sprocket 103 around which is trained a drive chain 104, as shown particularly in FIGURE 1. The drive chain 104 is trained around an upper idler sprocket 105 mounted on an idler shaft 105$a$, a drive sprocket 106 mounted on a shaft 107, an idler sprocket 108 mounted on an idler shaft 108$a$, a drive sprocket 109 mounted on a shaft 109$a$, a sprocket 110 mounted on the shaft 23, and finally around an idler sprocket 111 mounted on an idler shaft 111$a$. In this manner the motor 95 drives the belt 18 of the pan conveyor C and the endless conveying surface 26$a$ of the conveyor 26 which is trained around guides 112. Preferably, the endless conveying surface 26$a$ will be a slat type conveyor to permit circulation of air around the buns or rolls being transported thereon.

The sprocket 113, which is fixed to a hub 114 on the drum D, is driven from the shaft 107 through a chain 115$a$ and a sprocket 115 mounted on the shaft 107. A spring tensioned idler sprocket 116 is provided for the chain 115$a$ to take up any slack resulting from adjustment of the position of the drum D and is carried by a stub shaft 117 mounted on a slide 118 having a rod portion 118$a$ which is slideably carried by a plate 119 secured to framework F, a spring 120 on portion 118$a$ urging the sprocket 116 toward the chain 115$a$. The usual stop member 121 is mounted on the free end of the rod portion 118$a$.

In the operation of the machine, transverse rows of buns B which have been baked in the pans P are moved continuously in the direction indicated by the arrow $a$ on conveyors 24 and C. When the buns reach the front wall 38$a$ of suction box 38, the suction cups 31, which have previously engaged the tops of the buns B, are subjected to the suction created by the fan blades 77 and, as shown in FIGURE 1, tend to axially collapse and lift the buns B out of the pockets in the pans P. Not all of the cups 31 beneath the suction box 38 are at any one time in sealed engagement with a product. As the drum D continues to revolve in the counterclockwise direction in FIGURE 1, the buns B reach the upper run 40 of the conveyor 26 and the particular suction cups which have been transporting them move beyond the rear wall 38b of the suction box 38. It is at this point that the suction cups 31 release the buns B to the conveyor 26 in uniformly transverse rows, and the buns proceed to a discharge conveyor 41 which transports them for further processing. The pans P continue along the conveyor C and pass to a pan discharge conveyor 25.

If the buns B are seed buns, any seeds removed from the buns and entrained in the air stream are removed from the air stream in the larger volume, and therefore lower pressure, collecting housing 83 and are collected in the compartmented tray 85. Because of the location of the inlet 84 at one side of housing 83 and the location of opening 91 and baffle 93 in the low pressure housing 83, the air stream tends to be swirled in a cyclonic path about a vertical axis below inlet 84 and the seeds tend to be precipitated out to tray 85. Additional curved baffles may be employed in housing 83 to enhance this effect. The compartment walls 87 and 88 insure that the seeds are not reentrained in the air stream before it is able to proceed around baffle wall 93 and through the communicating duct 82 into the pan housing 74. Particularly the partitions 87 in front of the baffle 93 prevent the seeds which have been precipitated out from being moved into a pile under the baffle 93 and being swept up into the air stream. Thus, the blades 77 are prevented from chopping up the relatively oily seeds and creating an oily and unsanitary mash.

To change the position of the suction cups 31 relative to the upper run 40 of conveyor 26, it is necessary merely to turn the handle 70 to move the slides 43 upwardly or downwardly and/or to release the pin 59 from an opening 58 and swing lever 56 so that links 50 pull the lower ends of rails 46 forwardly or rearwardly about the pivots 48. Thus, a compound change of position is possible which is necessary to the depanning of various bun shapes. While in the drawings I have shown dinner rolls as being depanned for the sake of convenience of illustration only, it is to be understood that frankfurter buns, hamburg buns and many diverse farinaceous products may be depanned by the apparatus which I have illustrated.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In farinaceous product depanning apparatus: conveyor means for transporting products in pans; suction duct means supported a spaced distance from said conveyor means and in generally juxtaposed relation therewith; discharge conveyor means; traveling conveyor means having product engaging suction means in communication with said suction duct means and travelable relative thereto in a path passing adjacent to said conveyor means and to said discharge conveyor means to engage said products and deliver them to said discharge conveyor means; support means for said traveling conveyor means; means connecting said suction duct means with said support means; and means mounting said support means for said traveling conveyor means for movement toward and away from said discharge conveyor means to change the position of said suction duct means and traveling conveyor means relative thereto.

2. In farinaceous product depanning apparatus: generally longitudinally extending first conveyor means for trasporting products forwardly in pans; suction duct means supported a spaced distance above said conveyor means; generally longitudinally extending discharge conveyor means disposed a spaced distance above said first conveyor means just downstream from said suction duct means; frame means; traveling conveyor means supported thereon having product engaging members in communication with said suction duct means and travelable in an endless path subjacent said suction duct means to engage said products, lift them from the pans, and thence deliver them to said discharge conveyor means; slide means on said frame means mounting said traveling means for movement relative to said path toward and away from the front end of said discharge conveyor means; and means rockably mounting said slide means on said frame means.

3. In farinaceous product depanning apparatus: longitudinally extending first conveyor means for transporting products forwardly in pans; suction box means, open along the bottom thereof, supported a spaced distance above said conveyor means; discharge conveyor means extending longitudinally a spaced distance above said first conveyor means and having a front end disposed substantially under the rear edge of said suction box means; frame means; traveling conveyor means, thereon having product engaging members, passing along the bottom of said suction box means in communication therewith, and traveling in a path to engage the products in the pans and deliver them to said discharge conveyor means; support slide means on said frame means mounted for movement in a direction toward and away from the front end of said discharge conveyor means to various positions relative thereto and for retaining the traveling means in said positions; and means connecting said suction duct means with said support slide means.

4. In farinaceous product depanning apparatus: generally longitudinally extending conveyor means for transporting products forwardly in pans; suction box means open along the bottom thereof and supported a spaced distance above said conveyor means; discharge conveyor means extending generally longitudinally a spaced distance above said first conveyor means and having a front end beneath the rear edge of said suction box means; frame means; traveling conveyor means having product engaging members in communication with said suction box means and travelable in a path to engage said products and thence deliver them to said discharge conveyor means; support slide means for said traveling means on said frame means mounted for movement in a generally vertical plane toward and away from said discharge conveyer means to diversely position said product engaging members relatively thereto; connecting said suction duct means to said support slide means; and means for moving said support slide means to various positions and retaining said support means in said positions.

5. In farinaceous product depanning apparatus: generally longitudinally extending first conveyor means for transporting products forwardly in pans; suction duct means with front and rear walls open along the bottom thereof supported a spaced distance above said conveyor means; discharge conveyor means extending generally longitudinally a spaced distance above said first conveyor means and having a front end a spaced distance beneath the rear wall; frame means; subframe means rockably mounted thereon; traveling conveyor means thereon having product engaging means in communication with said suction duct means and travelable in an endless path along the bottom of said suction duct means to engage said products and deliver them to the front end of said discharge conveyor means; and slide means on said subframe means mounting said duct means for movement toward and away from said discharge conveyor means.

6. In farinaceous product depanning apparatus; frame means; conveyor means for transporting products forwardly in pans; suction duct means supported by said frame means a spaced distance above said conveyor means and open along the bottom thereof; discharge conveyor means; a perforate revolving drum, supported by said frame means and having accordion pleated bellows cups fixed generally in rows on its outer periphery and extending outwardly therefrom, in communication with said suction duct means and travelable in an endless path adjacent said first conveyor means and discharge conveyor means to engage said products, lift them from said pans, and deliver them to said discharge conveyor means; suction fan means connected with said duct means and exerting a suction sufficient to axially collapse said cups when they are adhered to a product; and means for revolving said drum; said suction duct means having front and rear walls; said discharge conveyor having an upper run commencing just below said rear wall and the path of said cups and extending longitudinally therefrom; said drum being mounted on axial shaft means; said shaft means being supported on slide means; guide frame means provided on said frame means for said slide means extending generally normally to said upper run of the discharge conveyor means; and means provided for moving said slide means along said guide frame means toward and away from said upper run of the discharge conveyor means.

7. The combination defined in claim 6 in which the one end of said drum is open to receive said suction duct means which extends into said drum with its open bottom adjacent the inner peripheral wall of the drum; and means connecting the opposite end of the suction duct means to said slide means.

8. The combination defined in claim 6 in which said guide frame means is pivotally mounted for swinging movement near its upper end; and retaining means is provided for selectively retaining said guide means in various angular positions relative to the upper run of said discharge conveyor means.

9. The combination defined in claim 8 in which the retaining means is connected to the guide frame means near its lower end and includes a handle member mounted on a shaft; an arm on said shaft; a link connecting said arm and guide frame means; and means for holding said handle in various positions.

10. In farinaceous product transfer apparatus: conveyor means for transporting farinaceous products in pans; suction duct means supported a spaced distance from said conveyor means and in generally juxtaposed relation therewith; a movable product engaging drum means in communication with said suction duct means travelable in an endless path to engage said products and thence move them away from the pans on said conveyor means; discharge conveyor means to which said drum delivers the product; slide means supporting said drum for movement in a generally vertical direction relative to said discharge conveyor means; means for moving said slide means to various positions; housing means of considerably larger volume than said suction box means connected therewith; suction fan means connecting with said housing means to draw an air stream through said product engaging means, suction duct means, and housing means successively; and means disposed in said housing means for collecting seeds and the like precipitated out of said air stream.

11. In farinaceous product transfer apparatus: conveyor means for transporting farinaceous products in pans; suction duct means supported a spaced distance from said conveyor means and in generally juxtaposed relation therewith; product engaging means in communication with said suction duct means travelable in a path to engage said products and move them away from the pans on said conveyor; housing means of considerably larger volume than said suction duct means connected therewith; suction fan means connecting with said housing means to draw an air stream through said product engaging means, suction duct means, and housing means successively; and removable means for collecting seeds and the like precipitated out of said air stream disposed in said housing means.

12. In farinaceous product transfer apparatus: conveyor means for transporting farinaceous products in pans; suction duct means supported a spaced distance above said conveyor means and in generally juxtaposed relation therewith; movable product engaging suction gripper means in communication with said suction duct means and travelable in a path to engage said products and move them away from the pans on said conveyor; housing means of considerably larger volume than said suction duct means connected therewith at one end of said housing means; suction fan means connecting with an opening in the opposite end of said housing means to draw an air stream through said gripper means, suction duct means, and housing means successively; and compartmented tray means in the lower end of said housing means for collecting seeds and the like precipitated out of said air stream.

13. The combination defined in claim 12 in which said suction duct means connects into the upper end of said housing means which is disposed under said conveyor means; and generally vertical baffle plate means is provided in said housing means at a spaced distance from the said opposite end thereof in alignment with said opening therein.

14. The combination defined in claim 13 in which said compartmented tray extends under said baffle plate means substantially to said opposite end of the housing.

15. The combination defined in claim 12 in which vertical transversely and longitudinally extending baffle members form said compartments in said tray.

16. The combination defined in claim 12 in which an opening is provided in one side wall of said housing means in which said tray snugly fits to provide a substantially airtight seal and out of which said tray may be withdrawn.

17. In farinaceous product transfer apparatus: conveyor means for transporting farinaceous products in pans; suction duct means supported a spaced distance from said conveyor means and in generally juxtaposed relation therewith; product engaging suction transfer means, in communication with said suction duct means, travelable in a path to engage said products and move them away from the pans on said conveyor; housing means of considerably larger volume than said suction duct means connected therewith; suction fan means connecting with said housing means to draw an air stream through said product engaging means, suction duct means, and housing means successively; said housing means incorporating means causing said air stream to be swirled in a cyclonic path; and means for collecting seeds and the like precipitated out of said air stream.

18. A method of depanning farinaceous products having embedded seeds or the like in their surfaces comprising the steps of: contacting the products with movable suction transfer members connected through suction duct means with suction creating means which pulls an air stream through the duct means; directing the air stream in a manner to precipitate out seeds dislodged from the products and entrained in the air stream upstream of the suction creating means; and collecting the seeds precipitated out.

19. The combination defined in claim 18 in which the air stream is caused to take a cyclonic path in a space of enlarged volume relative to the remainder of the suction duct means.

References Cited by the Examiner

UNITED STATES PATENTS

| | | | |
|---|---|---|---|
| 2,903,290 | 9/1959 | Morris et al. | 214—309 |
| 2,927,707 | 3/1960 | Reed et al. | 214—309 |
| 3,099,360 | 7/1963 | Petersen et al. | 214—309 |

HUGO O. SCHULZ, *Primary Examiner.*